United States Patent [19]
Pritchard

[11] 4,272,713
[45] Jun. 9, 1981

[54] SWITCHING TRANSCONDUCTANCE AMPLIFIER FOR INDUCTIVE LOADS

[76] Inventor: Eric K. Pritchard, 1702 Plymouth Ct., Bowie, Md. 20716

[21] Appl. No.: 89,678

[22] Filed: Oct. 30, 1979

[51] Int. Cl.³ .............................................. G05B 19/40
[52] U.S. Cl. .................................. 318/696; 318/680; 318/138; 330/8
[58] Field of Search ............... 318/685, 696, 680, 681, 318/679, 677, 138, 254; 330/8

[56] References Cited

U.S. PATENT DOCUMENTS

| 4,087,732 | 5/1978 | Pritchard | 318/696 |
| 4,100,471 | 7/1978 | Pritchard | 318/685 |
| 4,140,955 | 2/1979 | Drabing | 318/696 |
| 4,140,956 | 2/1979 | Pritchard | 318/696 |
| 4,171,510 | 10/1979 | Kiwaki et al. | 330/8 |

Primary Examiner—B. Dobeck
Attorney, Agent, or Firm—Leitner, Palan, Lyman, Martin & Bernstein

[57] ABSTRACT

A switching current amplifier for stepping motors utilizing a square hysteresis loop transformer to measure the motor winding load current directly, to determine the high and low switching points in reference to the position command signal, to compare the motor winding current to the determined switching points and to provide a switching signal to switch the output devices of the amplifier when the motor winding current reaches the switching points. The square hysteresis loop transformer is constructed to have a high common mode signal rejection.

6 Claims, 8 Drawing Figures

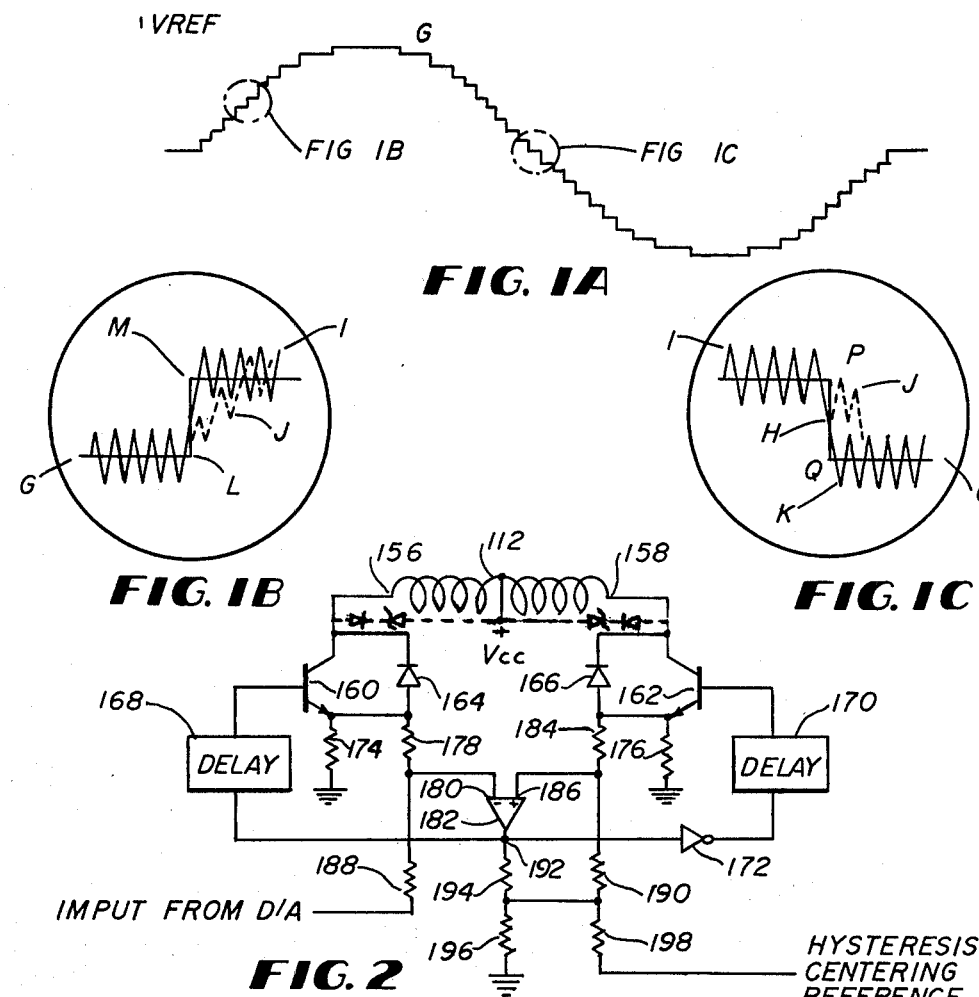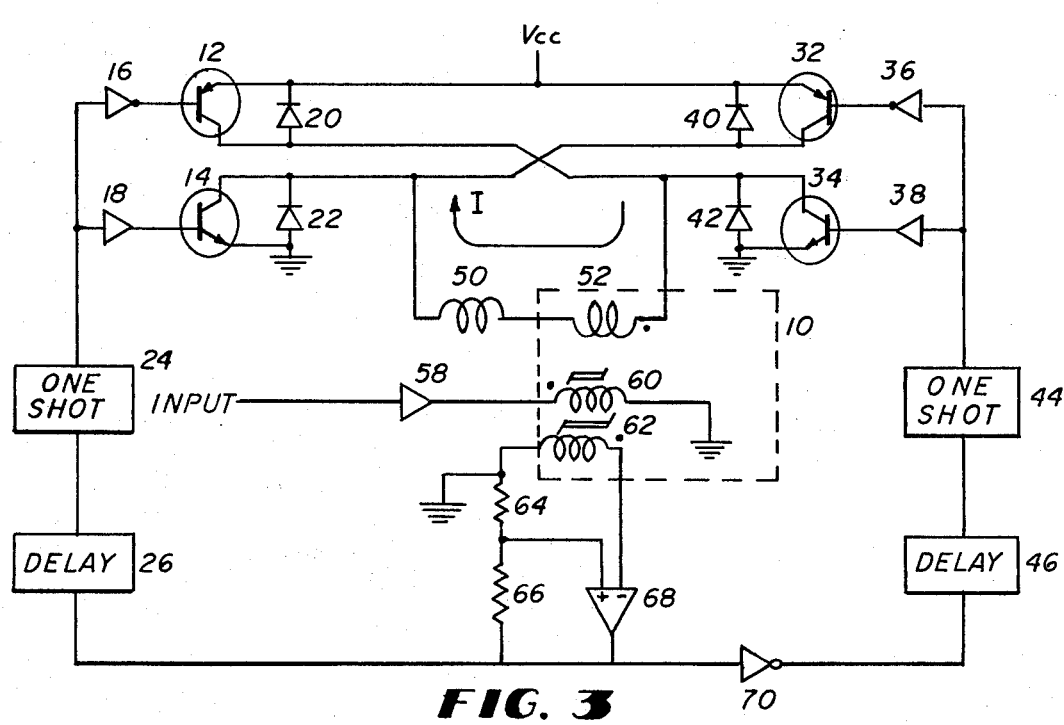

SWITCHING TRANSCONDUCTANCE AMPLIFIER FOR INDUCTIVE LOADS

BACKGROUND OF THE INVENTION

The present invention relates to a switching current amplifier for inductive loads and more specifically for inductive loads such as stepping motor windings. It relates to Applicant's patents, U.S. Pat. No. 4,100,471 and U.S. Pat. No. 4,140,956, a divisional of U.S. Pat. No. 4,087,732. These patents disclose switching current amplifiers for bifilar wound stepping motor inductances.

Switching amplifiers are ideal for stepping motor applications in that they provide current limiting, low dissipation, fast current rise and fast response. There are generally two approaches using switching amplifiers; the single high voltage pulse per step with low voltage hold or the continous chopping from a high voltage. This invention is concerned with the latter method. The use of a switching amplifier necessitates the mixing of a high frequency chopping signal and a position command signal to produce effective currents in the motor windings to provide the desired motor response. One of the methods to provide the chopping in the use of a fixed frequency clock to turn on the high voltage to the motor. The motor current is allowed to rise until it reaches a particular level whereupon it is turned off until the next clock pulse. Another method uses a capacitive delay circuit to turn off the motor current for a fixed period whenever it exceeds the required amount. In both of these methods the motor current is subject to the arbitrary fixed timing as well as to the variations dependent upon the high voltage supply level, the motor inductance and the motor back emf. An example of the deleterious effect of an arbitrary timing circuit can be seen in FIG. 1C. When the desired motor winding effective current represented by G is stepped down, the motor current would be allowed to decrease only to point H where an arbitrary timing pulse would turn on the output devices thus disrupting the rapid decrease required for precise motor control. Ideally, precise motor control is represented by the solid curve I in FIG. 1C wherein the current is allowed to drop unperturbed.

The output circuits provided an Applicant's U.S. Pat. Nos. 4,100,471 and 4,140,956 provides a means to test for the low current level as well as the high current level and to switch the amplifiers at the proper time, for example, to allow the current to drop to point K before the current is switched on again. Point K in FIG. 1C represents a level demanded by the position command signal. The parameters of the amplifier disclosed in U.S. Pat. No. 4,140,956 and shown in FIG. 2 of this specification are selected to provide high and low switching at an optimal frequency, low enough to reduce the dissipation in the output transistors but high enough so that the motor will not respond thereto. It is also desirable to select the frequency above the audio range so that the switching is not audible.

However, the prior art switching amplifier shown in FIG. 2 suffers from two disadvantages that are caused by the leakage inductance in the windings and associated wiring. First the leakage flux causes an increase in power dissipation in the output transistors. Second, the flyback requires inductive flyback clamping means (shown in dashed lines) and current flowing in the clamping means is not sensed in the sensing resistors 174, 176 which give spurious inputs to the comparator 182 causing the amplifier to switch at a too high frequency. This high frequency also causes an increase in power dissipation in the output transistors. Each of these factors, i.e., increased power dissipation caused by the leakage flux and the increased power dissipation caused by the too high frequency switching, can cause the output transistors 160 and 162 to fail besides providing imprecise motor control.

A bridge configuration such as in FIG. 3 might be used in an attempt to avoid the leakage inductance problem. However, the bridge configurations can still either produce sizeable transient error currents that are sensed by the sense resistors or have motor currents that bypass the sense resistors and, therefore, are not measured. Another method that could ideally be used is to place sensing devices in series with the motor windings to measure the currents directly. However, at the high switching frequencies involved, the prior art devices suffer from the inability to avoid the error caused by the common mode signal accompanying the signal produced by a current sensor.

Ideally, for precise, accurate switching of the chopping amplifier a device is required that can measure the load current directly, i.e., be placed in series with the load winding, that has a large high common mode signal rejection, that can determine the high and low current requirements in reference to the position command signal, and that can control the switching at the proper time.

SUMMARY OF THE INVENTION

Accordingly, the present invention provides a switching current amplifier for inductive loads with output devices that utilizes a square hysteresis loop transformer to measure the motor winding load current directly, to determine the high and low switching points in reference to the position command signal, to compare the motor winding current to the determined switching points and to provide a switching signal to switch the output devices of the amplifier when the motor winding current reaches a switching point. The transformer is also constructed to have a high common mode signal rejection by means already established in the transformer art.

OBJECTS OF THE INVENTION

An object of the present invention is the provision of means to sense the stepping motor current directly.

Another object of the present invention is the provision of means to determine the high and low switching points required by the position command signal.

A further object of the present invention is the provision of a means to compare the motor winding current to the switching points.

Still another object of the present invention is the provision of a means to provide a switching signal to switch the output devices at the proper time.

Other objects, advantages, and novel features of the present invention will become apparent from the following detailed description of the invention when considered in conjunction with the accompanying drawings.

BRIEF DESCRIPTION OF THE DRAWINGS

FIG. 1A is a typical stepped position command signal.

FIG. 1B shows the desired effective current and the actual chopped current for an increasing portion of the stepped position command signal shown in FIG. 1A.

FIG. 1C shows the desired effective current and the actual chopped current for a decreasing portion of the stepped position command signal shown in FIG. 1A.

FIG. 2 is a circuit diagram of a prior art switching amplifier.

FIG. 3 is a circuit diagram of a switching current amplifier constructed in accordance with the teachings of the present invention.

DESCRIPTION OF THE PREFERRED EMBODIMENT

Figure 4:
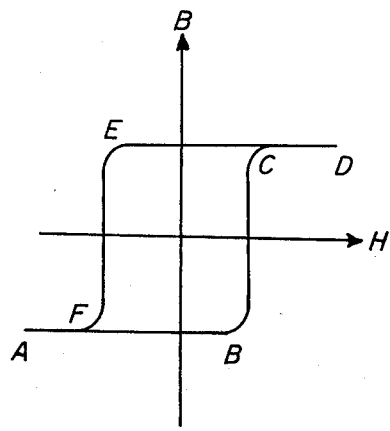
FIG. 4 shows the B-H curve of a square hysteresis loop transformer.

The switching transconductance amplifier for inductive loads of the present invention will now be described. The amplifier shown in FIG. 3 is symmetrical, components 12 through 26 being symmetrical to components 32 through 46, respectively. The amplifier makes use of a non-linear transformer 10 for load current measurement and switching control. The transformer 10 preferably exhibits a square loop B-H response as illustrated in FIG. 4.

The supply voltage $V_{cc}$ is connected to the emitters of output transistors 12 and 32. The collector of transistor 32 is connected to load winding 50. The collector of transistor 12 is connected to winding 52 of transformer 10, which in turn is connected to winding 50. Diodes 20 and 40 are connected across the collectors and emitters of transistors 12 and 32 respectively. The collector of transistor 12 is also connected to the collector of transistor 34 and likewise the collector of transistor 32 is connected to the collector of transistor 14. The emitters of transistors 14 and 34 are connected to ground. Diodes 22 and 42 are connected across the collectors and emitters of transistors 14 and 34 respectively. The bases of transistors 12 and 32 are connected to the output of inverting amplifiers 16 and 36, respectively. The inputs to amplifiers 16 and 36 are connected to the outputs of one-shots 24 and 44 respectively. The bases of transistors 14 and 34 are connected to amplifiers 18 and 38 which are also connected to the output of one-shots 24 and 44 respectively.

One-shots 24 and 44 are preferably of the clearable variety, Texas Instruments 74122, for example, with the input on pin 5 and the output on pin 8. The purpose of the one-shots is to limit the duration of conductance of the output transistors to a safe time so that in the event comparator 68 does not reflect the state of transformer 10, the output transistors do not burn up.

Figure 5:
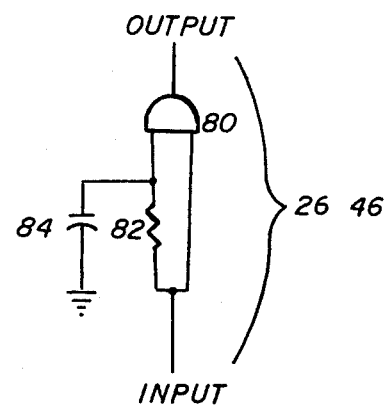
FIG. 5 illustrates a circuit implementation of a delay which may be used in the circuit of FIG. 3.

The inputs of one-shots 24 and 44 are connected to the outputs of delays 26 and 46 respectively. Delays 26 and 46 are designed to pass a high-to-low change immediately and to delay a low-to-high change. A preferred embodiment of the delays 26, 46 is shown in FIG. 5 and comprises a resistor 82, a capacitor 84 and an AND gate 80. As can be seen from FIG. 3 a high-to-low change on the input is immediately reproduced at the output. A low-to-high change is delayed by resistor 82 and capacitor 84 before goint to the output. The purpose of the delays are to insure that transistors 12, and 14, are not on when transistors 32 and 34 are on and vice versa.

Figure 6:
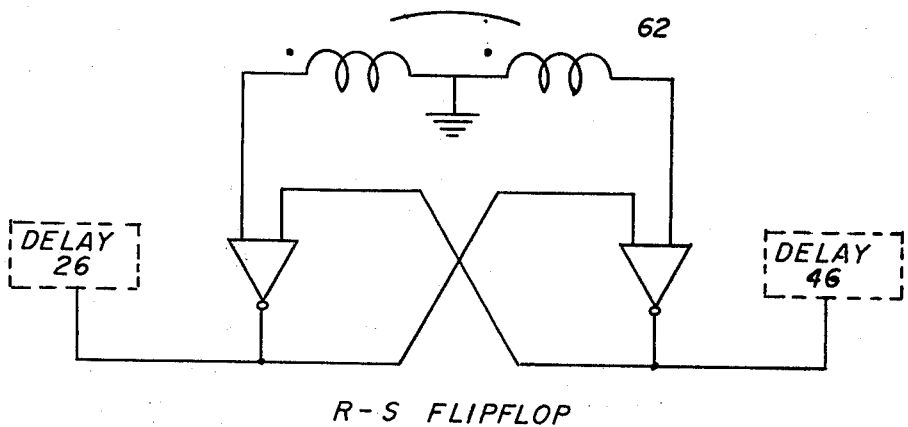
FIG. 6 is a circuit diagram of an R-S flip-flop that may be used instead of the comparator in the circuit of FIG. 3.

The input of delay 46 is connected to the output of inverter 70. The input of inverter 70 is connected to a threshold network comprising the resistors 64 and 66 and the output of comparator 68. Likewise, the input of delay 26 is connected to the threshold network as described above. The negative input of comparator 68 is connected to winding 62 of transformer 10. The opposite end of winding 62 connected is to ground and to resistor 64. The opposite end of resistor 64 is connected to resistor 66 and to the positive input to comparator 68. It is noted that comparator 68 and resistors 64 and 66 provide a memory function and could be replaced by an R-S flip-flop if winding 62 were center-tapped and the center-tap connected to ground. The configuration of such a circuit is shown in FIG. 6. The output of amplifier 58 is a current proportional to the input and drives winding 60. The opposite end of winding 60 is connected to ground.

The operation of the transformer described is as follows:

A position command signal representing a desired motor current is received at the input to amplifier 58 which converts the input to a current which is driven through winding 60 of transformer 10 to ground. This current establishes an offset flux that is magnetically coupled to winding 52. This offset flux biases the transformer and forces the transformer to operate around a level proportional to the input voltage level. This operation of the transformer around an offset level can be seen in reference to the B-H curves shown in FIG. 4. The bias caused by the input establishes the reference about which the transformer operates and is represented by the B axis in FIG. 4. As the input level changes the reference is changed to represent a new bias level i.e., in effect the B axis is moved along the H axis.

The determination of the high and low switching points is accomplished as follows:

Suppose the transformer is biased to operate around a reference current as described above. Suppose also that a large negative current is flowing in the motor windings 50 and thus through windings 52. This condition would put the operating point at position A, FIG. 4. As the current becomes more positive the operating point moves towards point B. As can be seen from FIG. 4, the magnetization does not change significantly and the output of the transformer is nearly zero. However, when a level of current change is reached corresponding to point B a slight increase in current causes the operating point to move from point B to point C resulting in a rapid and large change in magnetization. The point B can be established as a switching point and is reached after a change in field intensity level. The time point B is reached can be determined by sensing the large change in magnetization that occurs when the operating point moves from B to C by sensing the magnetization change with a winding 62 wound to produce for example, a positive pulse. If the current continues to rise, the operating point goes to point D with again little change in magnetizaion and near zero output. The path back to point A is similar, with point E representing a switching point and the large change in magnetization from point E to point F producing a negative pulse in winding 62. Thus the switching points are established by the characteristics of the transformer and can be adjusted by changing the turns ratio of the transformer windings. The output voltage polarity may be changed by reversing the sense winding.

The positive and negative pulses in winding 62 as described above are used as switching signals to signal that a switching point has been reached.

The operation of the circuit is described as follows:

Suppose the operating state of the circuit is such that transistors 32 and 34 have just been turned off. Transistors 12 and 14 will be turned on after the delay imposed by delay 26. The circuit behavior is dependant upon the direction of the current in winding 50. If it flows in a direction opposite to that indicated by the arrow in FIG. 3, it will create a flyback voltage. The inductive flyback causes diodes 20 and 22 to conduct the inductor current back to the power supply. Since the energy within winding 50 is decreasing the magnitude of the current decreases. If the current in winding 50 is in the direction indicated by the arrow in FIG. 3, transistors 12 and 14 will conduct current from the power supply through winding 50. This increases the energy in winding 50 and consquently the current through winding 50. In either case the rate of change of current is in the direction indicated by I, i.e., is becoming more positive. This current which passes through winding 52 and the current in winding 60 in transformer 10 move the operating point from point A to B and then to C in FIG. 4. In moving from point B to point C a rapid change of magnetization occurs which is sensed by winding 62 and as described above, is wound to produce a positive voltage pulse. When this voltage pulse exceeds the threshold voltage set by the threshold setting network comprising resistors 64 and 66 and the output of comparator 68, the comparator rapidly changes its output from a high to a low. This high-to-low change is produced at the input of delay 26 and at inverter 70 which causes a low-to-high change to be produced at the input of delay 46. The high-to-low at the input of delay 26 immediately clears one-shot 24 and forces amplifiers 16 and 18 to turn off transistors 12 and 14. After the delay period of delay 46 the one-shot 44 causes amplifers 36 and 38 to turn on output transistors 32 and 34. The current, during the delay period of delay 46 and during the period transistors 32 and 34 are on, is either a flyback current from winding 50, flowing in the direction indicated by I back to $V_{cc}$ via diodes 40 and 42 and is decreasing in magnitude or is flowing opposite to the direction indicated by I and is increasing in magnitude. In either case the rate of change is in the opposite direction to that indicated by I. The transformer operating point moves from point D to point E then to point F. During the E to F transition the winding 62 produces a negative pulse. When this negative pulse is less than the threshold voltage set by the threshold network comprising resistors 64 and 66 and the output of comparator 68 the comparator outputs a low-to-high change. This low-to-high change is inverted by inverter 70, passes immediately through delay 46, clears one-shot 44 and causes amplifiers 36 and 38 to turn off output transistors 32 and 34. The low-to-high change after being delayed by delay 26, causes one-shot 24 to force amplifiers 16 and 18 to turn on output transistors 12 and 14. This completes one switching cycle.

Because the operation of the transformer 10 depends upon the combination of all the currents in its windings, the operating parameters can be adjusted to satisfy various operational requirements. For example, the operation of the transformer can be weighted by adjusting the turns ratio of the respective windings. Also, the output of amplifier 58, which in the preferred embodiment is a current proportional to the input voltage representing a level of the position command signal, can be changed to reflect different required proportionality constants.

If it is desired to change the effective levels of current about which the transformer operates, the turns of winding 60 can be increased or decreased. The current flowing in winding 60 establishes an offset flux which biases the transformer by changing the field intensity H. As described above, by changing the resultant field intensity H the transformer is forced to operate around a level proportional to the current in winding 60 and is thus proportional to the input, i.e., the position command signal. The proportionality constant is determined by the amplifier 58 and the turns ratio of the transformer 10. This overall proportionality constant determines the switching points, i.e., points B and E, FIG. 4, as described above, and thus the chopping frequency.

The current sense technique described herein can be extended to unipolar devices by using two windings in place of the single winding 50. These windings would be connected to the end of the center-tapped winding so as to measure the net current.

Thus, a new and improved switching amplifier for driving inductive loads with output devices has been provided which measures load currents directly and has high common mode signal rejection. In addition, a non-linear transformer having a square hysteresis loop has been utilized in a new and novel way to determine the high and low switching points in reference to an input current proportional to the positon command signal.

Although the invention has been described and illustrated in detail, it is to be clearly understood that the same is by way of illustration and example only and it is not to be taken by way of limitation, the spirit and scope of this invention being limited only to the terms of the appended claims.

What is claimed is:

1. A switching current amplifier to drive inductive loads with output devices comprising:
   a. a first means for sensing an input signal from a position command signal;
   b. a non-linear transformer means responsive to said input signal for sensing the load current of said inductive load, for comparing said load current to high and low switching points of said amplifier, said switching points being a function of said transformer parameters, and for providing switching signals indicative of the load current attaining said high and low switch points;
   c. a second means for receiving said switching signal and for switching said output devices.

2. A switching current amplifier to drive inductive loads with output devices as provided in claim 1 wherein said non-linear transformer is a square hysteresis loop transformer.

3. A switching current amplifier to drive inductive loads with output devices as provided in claim 2 wherein said amplifier also includes delay means for delaying the current conduction of said output devices.

4. A switching current amplifier to drive inductive loads with output devices as provided in claim 2 wherein said amplifier also includes means to limit the conduction time of said output devices.

5. A switching current amplifier to drive inductive loads with output devices as provided in claim 1 wherein said second means is a voltage comparator.

6. A switching current amplifier to drive inductive loads with output devices as provided in claim 1 wherein said second means is an R-S flipflop.

* * * * *